(12) United States Patent
Rubinsztajn et al.

(10) Patent No.: US 6,312,818 B1
(45) Date of Patent: Nov. 6, 2001

(54) ADHESION ENHANCING ADDITIVES FOR RELEASE COATING COMPOSITIONS

(75) Inventors: Slawomir Rubinsztajn, Niskayuna; Melania I. Lapinski, Malta, both of NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/470,278

(22) Filed: Dec. 22, 1999

(51) Int. Cl.[7] ..................................................... B32B 27/08
(52) U.S. Cl. ........................... 428/447; 524/261; 524/265; 524/267; 524/588; 524/730; 524/773; 522/99
(58) Field of Search ............................... 428/447; 522/99; 524/261, 265, 267, 730, 773, 588

(56) References Cited

U.S. PATENT DOCUMENTS

| | | |
|---|---|---|
| 4,421,904 | 12/1983 | Eckberg et al. . |
| 5,164,461 | * 11/1992 | Mitchell et al. . |
| 5,340,898 | 8/1994 | Cavezzan et al. . |
| 5,342,870 | * 8/1994 | Stein et al. . |
| 5,475,044 | * 12/1995 | Stein . |
| 5,550,271 | * 8/1996 | Stein . |
| 5,567,764 | 10/1996 | Brasseur et al. . |

* cited by examiner

Primary Examiner—Robert Dawson
Assistant Examiner—Marc S. Zimmer

(57) ABSTRACT

A curable release coating composition is provided, comprising
- (a) a cationically curable functionalized polyorganosiloxane;
- (b) a photoinitiator; and
- (c) an adhesion promoter having the following formula (1):

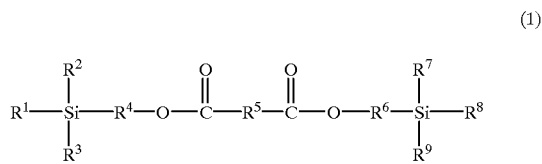

(1)

wherein $R^1$ to $R^3$ and $R^7$ to $R^9$ are independently alkyl, alkoxy, aryl, aryloxy or alkenyl hydrocarbon or halohydrocarbon groups having from 1 to 20 carbon atoms, R4 and R6 are are independently alkyl, aryl, or alkenyl hydrocarbon or halohydrocarbon groups having from 1 to 20 carbon atoms, and R5 is an alkyl, aryl, or alkenyl hydrocarbon or halohydrocarbon group having from 1 to 20 carbon atoms. Cured release coatings from theses compositions exhibit less rub off than other coatings, particularly on plastic substrates.

12 Claims, No Drawings

ADHESION ENHANCING ADDITIVES FOR RELEASE COATING COMPOSITIONS

BACKGROUND OF THE INVENTION

This invention relates to materials useful with release coatings, that is, coatings which release materials that would ordinarily be adherent. In particular, this invention relates to adhesion-enhancing additives for release coatings.

When labels, stamps, decorative laminates, transfer tapes, or the like are coated with an adhesive, it is desirable that the substrate, on which the labels (for example) are stored be easily peeled away when the label is ready for use. However, it is also important that the adhesive quality of the label not be derogated by removal from the substrate. This can be accomplished by coating the substrate with a release coating, commonly a silicone release coating. Silicone release coatings on paper, polyethylene, Mylar and other substrates also provide non-stick surfaces for food handling and industrial packaging applications.

Epoxy functionalized polyorganosiloxanes have proved especially useful as release coatings. While these polymers show good adhesion to substrates such paper, they show poorer adhesion to plastic films such as polyethylene, polypropylene, polystyrene and polyester. Release coatings must have good adhesion to the substrate, or the coating may be removed during the manufacturing process or along with the adhesive when the label is removed from the substrate. One method to improve adhesion to plastic films is to employ an adhesion promoter, also known as an anchorage additive. However, few adhesion promoters are known.

U.S. Pat. No. 5,567,764 discloses the use of trialkoxysilane or trialkoxysiloxane containing alkenyl functional polyorganosiloxanes as adhesion promoters for addition cure release coatings. In addition cure release coatings, crosslinking is effected in the presence of a metal catalyst, such as platinum, palladium, rhodium, ruthenium, or iridium. This is in contrast to ultraviolet (UV) cure release coatings, which are cationically crosslinked in the presence of a UV light and a photoinitiator. When 3-glycidoxypropyltrimethoxysilane, 3-methacryloxypropyltrimethoxysilane, 2-(3,4-epoxycyclohexyl)ethyltrimethoxysilane, and vinyltriacetoxysilane are used in UV cure release coatings, the achieved anchorage is not consistent and the release coatings rub off. Accordingly, there remains a continuing need in the art for adhesion promoters which will provide consistent anchorage of UV cure release coatings to substrates, particularly to plastic films.

SUMMARY OF THE INVENTION

A release coating composition is provided, comprising
(a) a cationically curable functionalized polyorganosiloxane;
(b) a photoinitiator; and
(c) an adhesion promoter having the following formula (1):

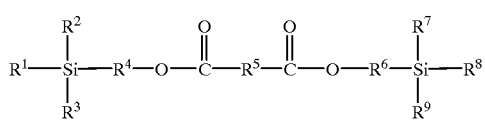

(1)

wherein $R^1$ to $R^3$ and $R^7$ to $R^9$ are independently alkyl, alkoxy, aryl, aryloxy or alkenyl hydrocarbon or halohydrocarbon groups having from 1 to 20 carbon atoms, $R^4$ and $R^6$ are independently alkyl, aryl, or alkenyl hydrocarbon or halohydrocarbon groups having from 1 to 20 carbon atoms, and $R^5$ is an alkyl, aryl, or alkenyl hydrocarbon or halohydrocarbon group having from 1 to 20 carbon atoms.

DETAILED DESCRIPTION OF THE INVENTION

A curable release coating composition comprises at least one cationically curable functionalized polyorganosiloxane, a photoinitiator and an anchorage additive of the following formula (1):

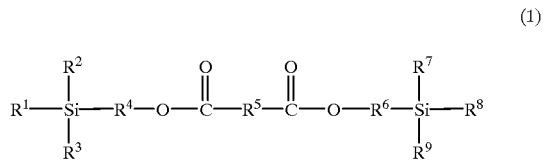

(1)

wherein $R^{1-3}$ and $R^{7-9}$ are independently alkyl, alkoxy, aryl, aryloxy or alkenyl halohydrocarbon functional groups having from 1 to 20 carbons, and $R^4$ and $R^6$ are independently alkyl, aryl, or alkenyl hydrocarbon or halohydrocarbon groups having from 1 to 20 carbon atoms and $R^5$ is an alkyl, aryl, or alkenyl hydrocarbon or halohydrocarbon group having from 1 to 20 carbon atoms.

The invention further comprises the release coating composition applied to a substrate, preferably a plastic film.

The cationically curable functionalized polyorganosiloxane has functional groups which are cationically crosslinkable. Exemplary cationically curable functionalized polyorganosiloxanes include epoxy functionalized polyorganosiloxanes, alkenyl ether functionalized polyorganosiloxanes, or a mixture thereof.

Suitable epoxy functionalized polyorganosiloxanes are described, for example, in U.S. Pat. No. 4,421,904 to Eckberg et al., which is incorporated by reference herein. Eckberg discloses cationically curable, precrosslinked, dialkylepoxy chain-stopped polydialkylalkylepoxysiloxane copolymers wherein the polysiloxane units contain lower alkyl substituents, preferably methyl groups. The epoxy functionality is obtained when certain of the hydrogen atoms on the polysiloxane chain of a polydimethyl-methylhydrogensiloxane copolymer are reacted in a hydrosilation addition reaction with a vinyl functional siloxane cross-linking fluid and other organic molecules which contain both ethylenic unsaturation and epoxide functionality. Ethylenically unsaturated species will add to a polyhydroalkylsiloxane to form a copolymer in the presence of a catalytic amount of platinum and/or rhodium metal. Although this addition reaction is the cure mechanism for other silicone compositions, in this case, a controlled amount of this cross-linking is permitted to take place in a silicone precursor fluid or intermediate, and this is referred to as "pre-crosslinking". Pre-crosslinking of the precursor silicone fluid means that there has been partial cross-linking or cure of the composition and offers the advantages of enabling swift ultraviolet light initiated cure with a low energy expenditure and without any need for a solvent.

The ultraviolet curable epoxy functional silicone intermediate fluid comprises a pre-crosslinked epoxy functional dialkylepoxy chain-stopped polydialkylalkylepoxysiloxane copolymer silicone fluid which is the reaction product of a vinyl- or allylic-functional epoxide and a vinyl functional siloxane cross-linking fluid having a viscosity of approximately 1 to 100,000 centipoise at 25° C. with a hydrogen functional siloxane precursor fluid having a viscosity of approximately 1 to 10,000 centipoise at 25° C. in the presence of an effective amount of precious metal catalyst for facilitating an addition cure hydrosilation reaction between the vinyl functional cross-linking fluid, vinyl functional epoxide, and hydrogen functional siloxane precursor fluid.

The vinyl- or allylic-functional epoxide may be a cycloaliphatic epoxy compound such as 4-vinylcyclohexeneoxide, allylgycidyl ether or glycidyl acrylate, vinylnorbornene monoxide, and dicyclopentadiene monoxide.

The precious metal catalyst can be selected from the group of platinum-metal complexes, which includes complexes of ruthenium, rhodium, palladium, osmium, iridium and platinum.

The vinyl functional siloxane cross-linking fluid can be selected from the group consisting of dimethylvinyl chain-stopped linear polydimethysiloxane, dimethylvinyl chain-stopped polydimethyl-methylvinyl siloxane copolymer, tetravinyltetramethylcyclotetrasiloxane and tetramethyldivinyldisiloxane. The hydrogen functional siloxane precursor fluid can be selected from the group consisting of tetrahydortetramethylcyclotetrasiloxane, dimethylhydrogen chain-stopped linear polydimethylsiloxane, dimethylhydrogen chain-stopped polydimethyl-methylhydrogen siloxane copolymer and tetramethyldihydrodisiloxane.

These polymers are suitable for cure in the presence of a free radical photoinitiator (b) and UV or electron beam (EB) radiation. Suitable photoinitiators include, but are not limited to, onium salts of an element of Groups 15 to 17 of the Periodic Table with weakly nucleophilic or non-nucleophilic anions, as disclosed in Eckberg et al., and U.S. Pat. No. 5,340,898 to Cavezzan et al., which are incorporated herein by reference. Exemplary photoinitiators are bis-aryliodonium salts having the following formula (2):

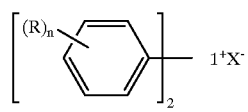

(2)

wherein R is an alkyl, alkoxy or haloalkyl radical having from 1 to 20 carbon atoms, preferably a dodecyl moiety, and n is in integer in the range from 1 to five, preferably 1, and X is $B(C_6F_5)_4$, $CF_3SO_3$, $SbF_6$, $AsF_6$, $PF_6$, or $BF_4$.

Adhesion promoters (c) have the following formula (1):

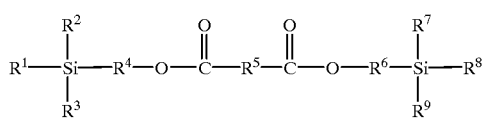

(1)

wherein $R^1$ to $R^3$ and $R^7$ to $R^9$ are independently alkyl, alkoxy, aryl, aryloxy or alkenyl hydrocarbon or halohydrocarbon groups having from 1 to 20 carbon atoms, more preferably 1 to 8 carbon atoms, and most preferably one carbon atom. $R^4$ and $R^6$ are independently alkyl, aryl, or alkenyl hydrocarbon or halohydrocarbon groups having from 1 to 20 carbon atoms, preferably 1 to 8 carbon atoms, and most preferably 2 to 6 carbon atoms. $R^5$ is an alkyl, aryl, or alkenyl hydrocarbon or halohydrocarbon group having from 1 to 20 carbon atoms. Preferred anchorage additives are selected from the group consisting of bis(trialkoxysilylalkyl)fumarates, (bis(trialkoxysilylalkyl)maleates, bis(trialkoxysilylalkyl)succinates and bis(trialkoxysilylalkyl)phthalates.

The polyorganosiloxane polymer having multiple epoxy or vinyl ether end groups polymer is blended with from about 0.01 to about 10, and preferably from about 0.1 to about 2 percent by weight (based on the total composition) of a photoinitiator, and an effective quantity, i.e., from about 0.1 to about 10, and preferably from about 1 to about 5 percent by weight of an adhesion promoter. The mixture is then coated onto a substrate using a blade coater or other method known in the art. Suitable substrates are known in the art, and include, for example clay coated paper, super-calendered Kraft (SCK) paper, polyethylene Kraft (PEK) paper and plastic, for example polyester, polyethylene, polypropylene, and polystyrene films. Good adhesion is particularly noted with polyethylene, polypropylene, polystyrene and polyester. The plastic films are preferably corona treated. The coating is then exposed to UV or EB radiation sufficient to cure the polymer.

The invention is further illustrated by the following non-limiting Examples.

EXAMPLE 1

All of the samples shown in Table 1 are obtained by the following general procedure, wherein an epoxy functionalized polyorganosiloxane having a viscosity of 350 centipoise (available from General Electric Co. under the trade name UV9315) is combined with 2 weight percent of photoinitiator (available from General Electric Co. under the trade name UV9380C) and 3 weight percent of the indicated additive. A polyester film (available from SCK or Pilcher Hamilton) is corona treated with energy of 1.5 watt/feet²/min. The treated film is then coated using a blade coater with a coat weight of 0.85 g/m² and cured by UV irradiation at 800 feet/minute using 1200 Watt/inch H lamps.

Effectiveness of the adhesion promoting additive is determined by testing the obtained coating for smear, migration and rub off. Smear is detected in an incompletely cured coating when a finger firmly pressed across the silicone film leaves an obvious permanent streak. Migration is detected by the Scotch™ brand cellophane tape test. The coating is considered well cured and migration free if a piece of No. 610 Scotch™ brand tape will stick to itself after having been first firmly pressed onto the silicone coating, then removed and doubled back on itself. All formulations performed well in smear and migration tests (data not shown).

Rub off occurs when a silicone coating fails to adhere to the substrate and can be rubbed off, using gentle finger pressure, and forming little balls of cured silicone. Results of the rub off evaluation are shown in Table 1.

TABLE 1

| | Time to Rub-off (Days) | |
|---|---|---|
| Additive | SCK | Pilcher Hamilton |
| No additive* | Immediate | Immediate |
| 3-Methacryloxypropyltrimethoxysilane* | Immediate | Immediate |
| 3-Glycidoxypropyltrimethoxysilane* | 2 | 2 |

TABLE 1-continued

| | Time to Rub-off (Days) | |
|---|---|---|
| Additive | SCK | Pilcher Hamilton |
| 3-Glycidoxypropyltrimethoxysilane and Vinyltriacethoxysilane (1:1 blend)* | 7 | 7 |
| 2-(3,4-Epoxycyclohexyl)ethyltrimethoxysilane* | 2 | 2 |
| Bis(3-trimethoxysilylpropyl) fumarate | >21 | >21 |

*Controls

EXAMPLES 2–28

Examples 2–28 are obtained by the following general procedure, wherein an epoxy functionalized polyorganosiloxane having a viscosity of 350 centipoise (available from General Electric Co. under the trade name UV9400) is combined with 2 weight percent of photoinitiator (available from General Electric Co. under the trade name UV9380C) and from 0 to 3 weight percent of bis(3-trimethoxysilylpropyl) fumarate. Examples with 0 weight percent of bis(3-trimethoxysilylpropyl)fumarate are comparative examples and outside the scope of the invention. Plastic films are coated on the Dixon™ coater with a coat weight of 0.8 g/m² and cured by UV irradiation at speed of 100 feet/min using a single bank of 300 watt/inch Fusion™ lamp. All films are corona treated with energy of 2 watt/feet²/min using Corotec Corona Treating Unit prior to silicon application. The effectiveness of anchorage additive is evaluated using the same tests as in Example 1. Results of evaluation are presented in Table 2.

TABLE 2

| Producer | Substrate | Time to Rub-off Initial | | | Time to Rub-off 2 Days Post Application | |
|---|---|---|---|---|---|---|
| | | 0%* | 1% | 3% | 1% | 3% |
| Rayven Inc. | PET, 2 mil/XG-200-275G | yes | some | no | yes | no |
| Mitsubishi Co. | Hostphan3900, 1 mil | yes | some | no | yes | no |
| DuPont Co. | Mylar J102/200, treated | yes | some | no | yes | no |
| DuPont Co. | Mylar D/200 | yes | no | no | yes | no |
| DuPont Co. | Mylar A/500 | yes | yes | no | yes | some |
| DuPont Co. | Mylar A 1.5 mil | yes | some | no | yes | no |
| SKC Ltd, Korea | PET, 1.5 mil | yes | some | no | yes | no |
| UCB Films Inc. | Rayoweb CR200 BOPP | yes | no | no | yes | no |
| Yenon Indust. | PET, 1.5 mil | yes | some | no | yes | some |

*Comparative examples

As the above results show, use of bis(3-trimethoxysilylpropyl) fumarate provides significant and unexpected improvement in rub off over other alkoxysilanes, while maintaining the desired low smear and migration properties. This allows for greater ease of manufacture, and subsequent rewinding operation. In an especially advantageous feature, these properties are observed on polyester fins.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A curable release coating composition comprising
   (a) at least one cationically curable functionalized polyorganosiloxane;
   (b) an effective catalytic amount of a photoinitiator; and
   (c) an effective amount of at least one anchorage additive having the following formula (1)

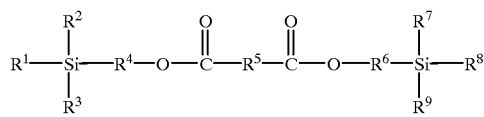

(1)

wherein $R^1$ to $R^3$ and $R^7$ to $R^9$ are independently alkyl, alkoxy, aryl, aryloxy or alkenyl hydrocarbon or halohydrocarbon groups having from 1 to 20 carbon atoms; $R^4$ and $R^6$ are independently alkyl, aryl, or alkenyl hydrocarbon or halohydrocarbon groups having from 1 to 20 carbon atoms; and $R^5$ is an alkyl, aryl, or alkenyl hydrocarbon or halohydrocarbon group having from 1 to 20 carbon atoms.

2. The composition of claim 1, wherein the cationically curable functionalized polysiloxane is selected from the group consisting of epoxy functionalized siloxanes, alkenyl ether functionalized siloxanes, and combinations thereof.

3. The composition of claim 1, wherein the photoinitiator is an onium salt of an element of Groups 15 to 17 of the Periodic Table with weakly nucleophilic or non-nucleophilic anion.

4. The composition of claim 1, wherein the photoinitiator is a bis-aryliodonium salts having the following formula (2)

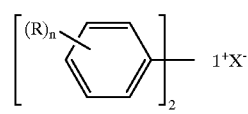

(2)

wherein R is an alkyl, alkoxy or haloalkyl radical having from 1 to 20 carbon atoms, n is in integer in the range from 1 to five, and X is $B(C_6F_5)_4$, $CF_3SO_3$, $SbF_6$, $AsF_6$, $PF_6$, or $BF_4$.

5. The photoinitiator of claim 4, wherein R is a dodecyl moiety and n is 1.

6. The composition of claim 1 wherein the adhesion promoter is selected from the group consisting of bis(trialkoxysilylalkyl)fumarates, bis(trialkoxysilylalkyl)maleates, bis(trialkoxysilylalkyl)succinates and bis(trialkoxysilylalkyl)phthalates.

7. The composition of claim 1, wherein the adhesion promoter is bis(trimethoxysilylpropyl) fumarate.

8. The composition of claim 1, wherein the adhesion promoter is present in an amount from about 0.1 to about 10 weight percent based on the total composition and more preferably from 1 to 5 weight percent.

9. The composition of claim 1, wherein the adhesion promoter is present in an amount from about 1 to about 5 weight percent based on the total composition.

10. An article for the release of an adhesive surface comprising the composition of claim 1 coated onto a substrate material.

11. The composition of claim 10, wherein the substrate material is a plastic or plastic coated paper.

12. The composition of claim 11, wherein the substrate material is selected from the group consisting of polyethylene, polypropylene, polystyrene and polyester.

* * * * *